United States Patent
Dulaurie et al.

(10) Patent No.: US 12,538,903 B2
(45) Date of Patent: Feb. 3, 2026

(54) PARTITION FOR A HIVE

(71) Applicant: SURFACE COMPOSEE PRODUCTION ET ASSEMBLAGE, Saint-Julien-sur-Garonne (FR)

(72) Inventors: Laurent Dulaurie, Leboulin (FR); Laurent Bugeaud, Saint-Julien-sur-Garonne (FR); Frédéric Michiels, Saint-Julien-sur-Garonne (FR); Jean-Luc Chanel, Saint-Julien-sur-Garonne (FR)

(73) Assignee: SURFACE COMPOSEE PRODUCTION ET ASSEMBLAGE, Saint-Julien-sur-Garonne (FR)

( * ) Notice: Subject to any disclaimer, the term of this patent is extended or adjusted under 35 U.S.C. 154(b) by 107 days.

(21) Appl. No.: 18/262,952

(22) PCT Filed: Jan. 28, 2022

(86) PCT No.: PCT/EP2022/052136
§ 371 (c)(1),
(2) Date: Aug. 1, 2024

(87) PCT Pub. No.: WO2022/162194
PCT Pub. Date: Aug. 4, 2022

(65) Prior Publication Data
US 2025/0151703 A1    May 15, 2025

(30) Foreign Application Priority Data
Jan. 28, 2021  (FR) ........................................ 2100840

(51) Int. Cl.
*A01K 47/00* (2006.01)
*A01K 47/06* (2006.01)

(52) U.S. Cl.
CPC .................................... *A01K 47/06* (2013.01)

(58) Field of Classification Search
None
See application file for complete search history.

(56) References Cited

U.S. PATENT DOCUMENTS

| 2014/0134920 A1* | 5/2014 | Linhart | ................. A01K 51/00 |
| 2019/0289830 A1* | 9/2019 | Williams | ............... A01K 47/06 |

(Continued)

FOREIGN PATENT DOCUMENTS

| FR | 3069412 A1 | 2/2019 | |
| WO | WO 2010/098853 A1 * | 9/2010 | ............. A01K 47/06 |
| WO | 2018165051 A1 | 9/2018 | |

OTHER PUBLICATIONS

Search Report from the French Intellectual Property Office on corresponding FR application (FR2100840) dated Oct. 1, 2021.

(Continued)

*Primary Examiner* — Joshua J Michener
*Assistant Examiner* — Henry Hooper Mudd
(74) *Attorney, Agent, or Firm* — Alumen IP Law PC (57) ABSTRACT

Radiating partition for a beehive, said beehive having a floor, a front wall, two side walls, a rear wall and a removable roof cover, the radiating partition having a rigid one-piece panel which is made of at least one insulating material, and at least one of its two faces is at least partly covered with at least one layer of a radiating material, the radiating partition being configured to be inserted between the front wall and the rear wall of the beehive in order to insulate the interior of the beehive.

14 Claims, 6 Drawing Sheets

(56) References Cited

U.S. PATENT DOCUMENTS

2019/0364853 A1* 12/2019 Voisin .................... A01K 47/06
2021/0161107 A1*  6/2021 Gamberoni ............ A01K 59/00
2022/0304283 A1*  9/2022 Torrie .................... A01K 47/06
2024/0081296 A1*  3/2024 Velikonja ............... A01K 47/06

OTHER PUBLICATIONS

International Search Report and Written Opinion on corresponding PCT application (PCT/EP2022/052136) from International Searching Authority (EPO) dated May 3, 2022.

* cited by examiner

PARTITION FOR A HIVE

TECHNICAL FIELD

The present invention relates to the field of beekeeping and more particularly a partition for a hive as well as a hive comprising at least one such partition. The invention aims in particular to improve the insulation of existing hives.

BACKGROUND

In a known way, a beehive has the form of a box, generally made of wood, in a parallelepiped shape and comprising a floor, a front wall, a rear wall, two side walls and a removable roof cover.

It is known to insert body frames side-by-side inside the hive, parallel to the side walls, to house the egg laying by the queen bee or to store pollen or honey intended to feed the bees or larvae. More precisely, each body frame is in the form of a removable frame comprising four thin wooden edges nailed or glued together to form a rectangular frame. The edges of the frame are connected by iron wires between which a wax foundation sheet is inserted on which the bees build honeycombs to produce the combs of honey. The beekeeper uses a tool known as a frame grip lifter to remove the frames glued by the propolis from the hive.

In a known manner, the first and last frames of the assembly may be used to enable worker bees to build stocks of reserve honey that are not accessible to the queen of the hive by passing along the sides or under the second body frame and the penultimate body frame. In doing so, only the lower and side edges of the first and last body frame are filled with honey first, which subsequently prevents access to the center of the wax foundation of the first and last body frame, which has a disadvantage.

In addition, over time, it was observed that the cold could be devastating for bees and therefore for the production of honey from the hive. Therefore, in this case, it is known to caulk the second and penultimate hive frame using flexible insulating material attached to the frame, such as, for example, polyurethane or bubble wrap.

However, it appears that these insulating materials may be either bulky and thermally ineffective in the case of polyurethane, or fragile in the case of bubble wrap, and therefore easily damaged, particularly perforated or torn when extracting the body frame with a frame grip lifter or when attacked by pests such as rodents or insects, for example wax moths. In particular, when insulating materials are damaged, the frame is less well caulked and may have an insulation fault.

In addition, the bees must move under and over the sides of the caulked frames to access the first frame and the last frame to produce honey. In other words, bees may have difficulty bypassing caulked frames and therefore producing honeycombs and honey on the entire wax foundation sheet of the first and last frame, especially in their center, which reduces the yield of the hive.

There is therefore a need for a simple, reliable and effective solution to overcome at least some of these disadvantages.

SUMMARY

To this end, the invention relates firstly to a radiating partition for a beehive, said hive comprising a floor, a front wall, two side walls, a rear wall, a removable roof cover, said radiating partition comprising a one-piece rigid panel, preferably of a substantially rectangular shape, made of at least one insulating material of which at least one of the two faces is partially covered with at least one layer of a radiating material, the radiating partition being configured to be inserted between the front wall and the rear wall of the beehive in order to insulate the interior of the hive.

In other words, the panel comprises at least two elements: a panel made of an insulating material and at least one layer covering at least one of the faces of the panel, preferably the face located on the side of the center of the hive, made of a radiating material. Thus, the radiating partition makes it possible to protect the bees present in the hive from variations in temperature and in particular from the cold. As it insulates and radiates thermal energy at the same time, the partition may thus be described as iso-radiating. The use of a panel, which forms the body of the radiating partition, gives strength and insulation to the hive, while the radiating layer increases the effectiveness of the cold insulation by allowing significant conservation of heat inside the hive.

The term "radiating material" is understood to mean a material capable of largely reflecting thermal energy, for example more than 50% of the thermal energy it receives.

According to a characteristic of the invention, the layer of radiating material has a thermal emissivity of less than 0.2, preferably less than 0.1 in order to increase the insulating power of the panel and therefore of the hive.

Preferably, the layer of radiating material comprises or consists of non-oxidized or polished aluminum, non-oxidized or polished aluminum having good radiation characteristics (thermal emissivity of about 0.09 for non-oxidized aluminum and of the order of 0.05 for polished aluminum), or any other suitable material, preferably having a thermal emissivity of less than or equal to 0.10, such as for example polished zinc (0.03) or oxidized zinc (0.10), polished copper (0.03) or polished brass (0.03 to 0.05), or less than or equal to 0.20 such as for example stainless steel (0.20), polished steel (0.20) or non-oxidized iron (0.20).

In an embodiment, the layer of radiating material completely covers at least one face of the panel.

In another embodiment, the layer of radiating material covers at least one face of the panel over at least 50%, or even at least 70%, preferably at least 80% of its surface.

The layer of radiating material may be attached to the face of the panel, for example by gluing, stapling, nailing, pressing or any other suitable means of attaching. Alternatively, the layer of radiating material may be a paint applied to the face or faces of the panel.

In an embodiment, only one face of the radiating partition comprises a layer of radiating material, i.e. only one face of the insulating panel is covered with at least one layer of a radiating material.

In another embodiment, the two faces of the radiating partition each comprise a layer of radiating material, of an identical or different material.

Preferably, the panel of the radiating partition is made of solid wood, such as balsa or any other solid wood with high insulation capacity.

In another embodiment, the panel is made of plywood, for example of the CTB-X, CTB-H type or any other suitable type of plywood. In particular, the core of the panel may be made of a material of polyurethane or polystyrene type, in particular of extruded polystyrene (for example of the Styrodur® type), arranged between two layers of wood veneer, for example glued.

In another embodiment, the panel is an oriented strand board (OSB).

In another design, the panel is made of slatted wood.

These different materials are rigid and strong and make it possible to effectively insulate the hive.

Advantageously, the radiating partition has a rot-proof character, in particular by being covered with a protective oil, for example, linseed oil.

Preferably, the radiating partition comprises at least one insertion member suitable for receiving an extraction tool making it possible to extract said radiating partition from the hive body. The extraction tool is, for example, a frame grip lifter. In this way, the extraction tool cooperates with the insertion member so that the beekeeper may quickly and easily extract the radiating partition from the hive without damaging the radiating partition.

More preferably, the insertion member has the form of a groove formed at the upper portion of at least one of the two faces of the radiating partition.

Preferably, the radiating partition being delimited by an upper edge, a lower edge, two side edges having two faces, each of the faces connecting the upper edge, the lower edge and the side edges, the groove is formed less than two centimeters from the upper edge or side edges of the radiating partition. The groove may be horizontal or vertical. In this way, a beekeeper may easily and quickly extract the radiating partition by levering by inserting a frame lifter into the groove.

In another embodiment, the insertion member is a handle or hook wherein an extraction tool may be inserted.

Preferably, the radiating partition is full. In other words, the radiating partition is filled with material on 100% of its surface.

In another embodiment, the radiating partition is filled on at least 80% of its surface, preferably more than 90% so as to delimit at least one through-opening.

The fuller the radiating partition is on a substantial surface, the better the heat insulation of the hive.

Preferably, the radiating partition delimits at least one through-opening and comprises a grid, mounted in said through-opening and adapted to prevent the queen of the hive from crossing the opening while allowing the worker bees to pass through it. In other words, the openings of the grid are sized to allow the passage of worker bees while preventing the queen of the hive from crossing the grid.

Advantageously, the at least one through-opening is arranged near the lower edge, i.e. at the lower portion of the radiating partition. In a beehive, heat rises in the upper portion of the body of the hive. In this way, the bees rather move towards the upper portion of the body in order to take advantage of the heat and less towards the lower portion of the body of the hive, which is colder. It is therefore more suitable to position a through-opening in the lower portion of each radiating partition. In this way, fewer bees will be in front of the through-opening and bees wishing to move around on either side of the grid may do so more easily than if the through-opening were formed in the upper, more congested portion of the partition.

In an embodiment, the thickness of the radiating partition is between 24 and 25 mm, which corresponds to the standard thickness of a body frame of a Dadant hive, in order to be able to position the radiating partition at the location of a body frame in such a hive.

In another embodiment, the thickness of the radiating partition is between 10 and 12 mm, which is about half the value of the thickness of a frame of a Dadant hive. Thus, two radiating partitions will occupy the space of a single body frame of a Dadant hive, which allows only one body frame to be removed when two radiating partitions are placed in the hive. In other words, it is not necessary to remove two body frames but only one body frame to place two radiating partitions in the hive by occupying the same thickness.

Preferably, the layer of radiating material is attached with double head rivets or pairs of porthole screws. Such a mechanical connection is particularly suitable for attaching the layer of radiating material to the panel and its strength makes it possible to prevent the layer of radiating material from peeling off when the propolis and/or wax that was glued to the layer of radiating material and/or the edges of the panel is removed.

In an embodiment, the radiating partition comprises at least one heating element and is referred to as "heating radiating partition".

The at least one heating element may be integrated into the panel of the heating radiating partition, in particular in a housing, or mounted on a face or edge of the heating radiating partition.

Preferably, the at least one heating element is powered electrically, for example via an electrical cable, by an electrical power source (internal or external to the hive).

In one embodiment, the partition may comprise at least one "male" type protruding metal terminal or pin making it possible to connect the at least one heating element to an electrical power source. The use of one or more "male" type terminals or pins makes it possible to avoid the presence of a connection port that the bees could plug, for example with a mixture of propolis and/or wax.

Alternatively or additionally, the partition may comprise one or more electric wires extending from an edge of the panel to connect the at least one electric element to an electrical power source. In this case, when the partition is mounted in the hive, it is sufficient to arrange the free end of the cable(s) outside the hive and replace the cover and then connect the wire(s), for example via one or more connectors to the electrical power source.

Advantageously, the thickness of the at least one heating element is less than 3 mm, preferably about 1 mm.

Advantageously, the at least one integrated heating element is of the resistance type, which is a simple and effective way to generate heating.

Preferably, the at least one heating element is glued to the radiating layer.

In a particular embodiment, the at least one heating element is a low thickness resistance, less than 3 mm, housed in a housing provided for this purpose, formed on a face of the partition panel by being glued onto the layer of radiating material that covers the face of the panel. In this way, the heat generated by the heating element is transmitted via conduction through the layer of radiating material and the wood is used as insulation to reflect the heat.

Further advantageously, the heating radiating partition comprises four resistances extending longitudinally mounted on one of the faces of the heating radiating partition, two of which are arranged each extending along a side edge of the panel, one being arranged extending along the lower edge of the panel and one is arranged in the upper portion of the panel extending transversely.

In one embodiment, the partition comprises at least one temperature probe capable of being connected to a control module.

The invention also relates to a beehive comprising a floor, a front wall, two side walls, a rear wall, a removable roof cover, at least one body frame, each body frame having the form of a removable hive frame, said frame comprising four thin edges connected by metal wires between which a wax foundation sheet is inserted allowing honey production by the bees, said hive being remarkable in that it further comprises at least one radiating partition such as presented previously.

Preferably, the beehive comprises at least four body frames, a first radiating partition such as presented previously and a second radiating partition such as presented previously, each body frame being arranged vertically in the hive between the front wall and the rear wall, the first partition being placed in the hive between a first body frame, adjacent to one of the side walls of the hive, and a second body frame, the second radiating partition being placed between a third body frame and a fourth body frame, adjacent to the other side wall of the hive.

The first radiating partition and the second radiating partition thus make it possible to effectively insulate the interior of the hive body located between the first radiating partition and the second radiating partition. This way, the bees moving in this zone are also protected from the cold. In addition, the first body frame and the last body frame are only accessible by the bees and not by the queen of the hive. In this way, the first and last body frames have a single production role, i.e. reserve, of honey.

In another embodiment, the hive comprises a plurality of body frames of equal dimensions and two radiating partitions such as presented previously, of which the thickness of each is equal to half the thickness of a body frame. Thus, in a hive suitable for receiving a given number of body frames, only one body frame must be removed to be replaced with two radiating partitions whereas the solutions of the prior art required the use of two caulked body frames instead of two standard body frames.

In one embodiment, the hive comprising at least one heating radiating partition such as described previously.

Preferably, the at least one heating element of said at least one heating radiating partition is electrically powered, for example via an electrical cable, by an electrical power source (internal or external to the hive).

Advantageously, each heating radiating partition comprises four resistances extending longitudinally mounted on one of the faces of said heating radiating partition. Two resistances are arranged, each extending along the left side edge and right side edge of the panel. A resistance is arranged extending along the lower edge of the panel and a resistance is arranged in the upper portion of the panel extending transversely parallel to the upper edge of the panel, under the three grooves. The resistances are mounted on the faces which are turned towards the center of the hive in order to heat the body frames which are placed between the two heating radiating partitions.

Advantageously, the hive comprises a connector configured to receive a current from an external electrical power source and which is electrically connected to at least one heating element.

Alternatively or additionally, the hive comprises an internal electrical power source, for example a rechargeable battery, in order to power the at least one heating element of the at least one heating radiating partition.

The hive may further comprise a thermostat mounted inside the hive by being electrically connected to at least one heating element of the at least one heating radiating partition and configured to, when said thermostat is electrically powered by an electrical power source (internal or external), measure the ambient temperature inside the hive and to allow current to flow as long as the measured temperature is below a predetermined ceiling temperature.

The invention also relates to a heating partition for beehive, said hive comprising a floor, a front wall, two side walls, a rear wall, a removable roof cover, said heating partition comprising a one-piece rigid panel, preferably in a substantially rectangular shape, made of at least one insulating material, the heating partition being configured to be inserted between the front wall and the rear wall of the beehive in order to insulate the interior of the hive and comprising at least one heating element.

The at least one heating element may be incorporated into the panel, including a housing, the heating partition, or mounted on a face or edge of the heating partition.

Preferably, the at least one heating element is powered electrically, for example via an electrical cable, by an electrical power source (internal or external to the hive).

In one embodiment, the partition may comprise at least one "male" type protruding metal terminal or pin making it possible to connect the at least one heating element to an electrical power source. The use of one or more "male" type terminals or pins makes it possible to avoid the presence of a connection port that the bees could plug, for example with a mixture of propolis and/or wax.

Alternatively or additionally, the partition may comprise one or more electric wires extending from an edge of the panel to connect the at least one electric element to an electrical power source. In this case, when the partition is mounted in the hive, it is sufficient to arrange the free end of the cable(s) outside the hive and replace the cover and then connect the wire(s), for example via one or more connectors to the electrical power source.

Advantageously, the thickness of the at least one heating element is less than 3 mm, preferably about 1 mm.

Advantageously, the at least one heating element is of the resistance type, which is a simple and effective way to generate heating.

In a particular embodiment, the at least one heating element is a low thickness resistance, less than 3 mm, housed in a housing provided for this purpose, formed on a face of the partition panel by being glued onto the layer of radiating material that covers the face of the panel. In this way, the heat generated by the heating element is transmitted via conduction through the layer of radiating material and the wood is used as insulation to reflect the heat.

Advantageously still, the heating partition comprises four resistances extending longitudinally mounted on one of the faces of said heating partition, two of which are arranged each extending along a side edge of the panel, one is arranged by extending along the lower edge of the panel and one is arranged in the upper portion of the panel by extending transversely.

In one embodiment, the partition comprises at least one temperature probe capable of being connected to a control module.

In an embodiment, at least one of the two faces of the panel of the at least one heating partition is partially covered with at least one layer of a radiating material.

According to a characteristic of the invention, the layer of radiating material has a thermal emissivity of less than 0.2, preferably less than 0.1 in order to increase the insulating power of the panel and therefore of the hive.

Preferably, the layer of radiating material comprises or consists of non-oxidized or polished aluminum, non-oxidized or polished aluminum having good radiation characteristics (thermal emissivity of about 0.09 for non-oxidized aluminum and of the order of 0.05 for polished aluminum), or any other suitable material, preferably having a thermal emissivity of less than or equal to 0.10, such as for example polished zinc (0.03) or oxidized zinc (0.10), polished copper (0.03) or polished brass (0.03 to 0.05), or less than or equal to 0.20 such as for example stainless steel (0.20), polished steel (0.20) or non-oxidized iron (0.20).

In an embodiment, the layer of radiating material completely covers at least one face of the panel.

In another embodiment, the layer of radiating material covers at least one face of the panel over at least 50%, or even at least 70%, preferably at least 80% of its surface.

The layer of radiating material may be attached to the face of the panel, for example by gluing, stapling, nailing, pressing or any other suitable means of attaching. Alternatively, the layer of radiating material may be a paint applied to the face or faces of the panel.

In an embodiment, a single face of the heating partition comprises a layer of radiating material, i.e., a single face of the insulating panel is covered with at least one layer of a radiating material.

In another embodiment, the two faces of the heating partition each comprise a layer of radiating material, of an identical or different material.

Preferably, the panel of the heating partition is made of solid wood, such as balsa or any other solid wood with high insulation capacity.

In another embodiment, the panel is made of plywood, for example of the CTB-X, CTB—H type or any other suitable type of plywood. In particular, the core of the panel may be made of a material of polyurethane or polystyrene type, in particular of extruded polystyrene (for example of the Styrodur® type), arranged between two layers of wood veneer, for example glued.

In another embodiment, the panel is an oriented strand board (OSB).

In another design, the panel is made of slatted wood.

These different materials are rigid and strong and make it possible to effectively insulate the hive.

Advantageously, the heating partition has a rot-proof character, in particular by being covered with a protective oil, for example, linseed oil.

Preferably, the heating partition comprises at least one insertion member suitable for receiving an extraction tool making it possible to extract said heating partition from the hive body. The extraction tool is, for example, a frame grip lifter. In this way, the extraction tool cooperates with the insertion member so that the beekeeper may quickly and easily extract the heating partition from the hive without damaging the heating partition.

More preferably, the insertion member has the form of a groove formed at the level of the upper portion of at least one of the two faces of the heating partition.

Preferably, the heating partition being delimited by an upper edge, a lower edge, two side edges having two faces, each of the faces connecting the upper edge, the lower edge and the side edges, the groove is formed less than two centimeters from the upper edge or side edges of the heating partition. The groove may be horizontal or vertical. In this way, a beekeeper may easily and quickly extract the heating partition by levering by inserting a frame lifter into the groove.

In another embodiment, the insertion member is a handle or hook wherein an extraction tool may be inserted.

Preferably, the heating partition is full. In other words, the heating partition is filled with material on 100% of its surface.

In another embodiment, the heating partition is filled on at least 80% of its surface, preferably more than 90% so as to delimit at least one through-opening.

The fuller the heating partition is on a substantial surface, the better the heat insulation of the hive.

Preferably, the heating partition delimits at least one through-opening and comprises a grid, mounted in said through-opening and suitable for preventing the queen of the hive from passing through the opening while allowing the worker bees to pass through it. In other words, the openings of the grid are sized to allow the passage of worker bees while preventing the queen of the hive from crossing the grid.

Advantageously, the at least through-opening is arranged near the lower edge, i.e. at the lower portion of the heating partition. In a beehive, heat rises in the upper portion of the body of the hive. In this way, the bees rather move towards the upper portion of the body in order to take advantage of the heat and less towards the lower portion of the body of the hive, which is colder. It is therefore more suitable to position a through-opening in the lower portion of each heating partition. In this way, fewer bees will be in front of the through-opening and bees wishing to move around on either side of the grid may do so more easily than if the through-opening were formed in the upper, more congested portion of the partition.

In an embodiment, the thickness of the heating partition is between 24 and 25 mm, which corresponds to the standard thickness of a body frame of a Dadant hive, in order to be able to position the heating partition at the location of a body frame in such a hive.

In another embodiment, the thickness of the heating partition is between 10 and 12 mm, which is about half the value of the thickness of a frame of a Dadant hive. Thus, two heating partitions will occupy the space of a single body frame of a Dadant hive, which allows only one body frame to be suppressed when two heating partitions are placed in the hive. In other words, it is not necessary to remove two body frames but only one body frame to place two heating partitions in the hive occupying the same thickness.

The invention also relates to a beehive comprising a floor, a front wall, two side walls, a rear wall, a removable roof cover, at least one body frame, each body frame being in the form of a removable hive frame, said frame comprising four thin edges connected by metal wires between which a wax foundation sheet is inserted allowing honey production by the bees, said hive being remarkable in that it further comprises at least one heating partition such as presented previously.

The invention also relates to a beehive comprising a floor, a front wall, two side walls, a rear wall, a removable roof cover, at least one body frame, each body frame being in the form of a removable hive frame, said frame comprising four thin edges connected by metal wires between which a wax foundation sheet is inserted allowing honey production by the bees, said hive being remarkable in that it further comprises at least one heating element mounted on at least one of the walls of the hive or under the hive cover or on the floor of the hive or on at least one of the body frames of the hive.

The at least one heating element may be integrated into an element of the hive, in particular in a housing, or mounted on a surface or edge of an element of the hive (wall, frame, partition, etc.).

Preferably, the at least one heating element is powered electrically, for example via an electrical cable, by an electrical power source (internal or external to the hive).

In one embodiment, the hive may comprise at least one "male" type protruding metal terminal or pin making it possible to connect the at least one heating element to an electrical power source. The use of one or more "male" type terminals or pins makes it possible to avoid the presence of a connection port that the bees could plug, for example with a mixture of propolis and/or wax.

Alternatively or in addition, the hive may comprise one or more electrical wires extending from the at least one electrical element and making it possible to connect it to an electrical power source. In this case, it is sufficient to place the free end of the cable(s) outside the hive and replace the cover then connect the wire(s), for example via one or more connectors to the electrical power source.

Advantageously, the thickness of the at least one heating element is less than 3 mm, preferably about 1 mm.

Advantageously, the at least one heating element is of the resistance type, which is a simple and effective way to generate heating.

In a particular embodiment, the at least one heating element is a low thickness resistance, less than 3 mm, housed in a housing provided for this purpose, formed in an element of the hive, for example by being glued.

Further advantageously, the hive comprises a plurality of resistances mounted at various locations of the hive, preferably inside, for example on or in frames, partitions, floor, lid.

In one embodiment, the hive comprises at least one temperature probe capable of being connected to a control module.

The invention also relates to a control module of a hive comprising at least one heating partition, said control module being capable of being placed inside or outside said hive and which is configured to:
  be powered electrically by an internal or external power source,
  receive temperature measurements from at least one temperature probe placed inside the hive,
  electronically regulate the temperature inside the hive between a floor temperature and a ceiling temperature (thermostat function) based on the temperature measurements received.

For this purpose, the control module may be paired with one or more temperature probes placed inside the hive and configured to receive temperature measurements from the at least one probe.

Advantageously, the control module is configured to perform temperature regulation by micro-interruptions and/or by controlling the operation of only a portion of the heating elements of the hive partition(s). This allows the heating inertia to be managed to avoid reaching the ceiling temperature even if the temperature continues to rise after the heating is switched off or the heating power is reduced.

Advantageously, the floor temperature may be chosen to kill the "*Varroa destructor*", which is a species of parasitic mites of the adult bee, larvae and nymphs. For this purpose, the floor temperature should preferably be greater than or equal to 42° C.

Advantageously, the ceiling temperature is chosen so as to avoid killing the bee larvae, for example by being below 44° C.

The test module may be mounted in or on the hive or placed outside the hive.

Advantageously, the control module is configured to control multiple partitions and/or hives simultaneously.

The control module advantageously comprises a casing.

The invention also relates to a hive comprising at least one heating partition such as described above, preferably radiating, at least one temperature probe and a control module such as described above, mounted in or on the hive and connected to said at least one temperature probe, for example by a cable or a wireless means of communication.

The invention also relates to a hive system comprising a hive comprising at least one heating partition such as described above, preferably radiating, at least one temperature probe and a control module as described above, placed outside the hive and connected to said at least one temperature probe, for example by a cable or a wireless means of communication.

The invention also relates to an insulating partition for beehive, said hive comprising a floor, a front wall, two side walls, a rear wall, a removable roof cover, said insulating partition comprising a rigid one-piece panel, preferably of a substantially rectangular shape, made of at least one insulating material, for example solid wood, plywood, oriented strand board or slatted wood, the insulating partition being configured to be inserted between the front wall and the rear wall of the beehive in order to insulate the interior of the hive.

In one embodiment of this insulating partition, the panel delimits at least one through-opening wherein a grid is mounted suitable for preventing the queen of the hive from passing through the opening while allowing the worker bees to pass through it.

In one embodiment of this insulating partition, the insulating partition comprises at least one insertion member suitable for receiving a tool for extracting the insulating partition.

Preferably, each insertion member is placed near the upper edge of said insulating partition. In this way, when an insulating partition is mounted in a hive, the beekeeper who wishes to remove the insulating partition using an extraction tool may easily access the insertion member to insert the extraction tool and remove the insulating partition from the hive.

In an embodiment, the insertion member is placed on at least one face of the insulating partition.

Preferably, the insertion member is a recess, for example in the form of a groove formed at the upper portion of at least one of the faces of the insulating partition, for example less than 2 centimeters from the upper edge. The groove may extend horizontally on the face of the insulating partition in the position of use. The groove is formed so that an extraction tool, such as a frame lifter, may be easily inserted into said groove in order to extract the insulating partition from the hive, in particular by leverage on an adjacent frame. Preferably, several grooves are formed in each face of the insulating partition.

BRIEF DESCRIPTION OF THE DRAWINGS

Further characteristics and advantages of the invention will further appear upon reading the description that follows. This is purely illustrative and should be read in conjunction with the appended drawings in which.

DETAILED DESCRIPTION

The invention relates in particular to a radiating partition for a hive, as well as a hive comprising such a radiating partition. The hive according to the invention is a modern hive, in particular of the modular vertical hive or horizontal bar hive type. In particular, the hive according to the invention may be a Dadant hive, a Langstroth hive, a De Layens hive, a Voirnot hive, a Warré hive or a Zander hive or any suitable hive wherein the radiating partition may be mounted according to the invention.

Figure 1:
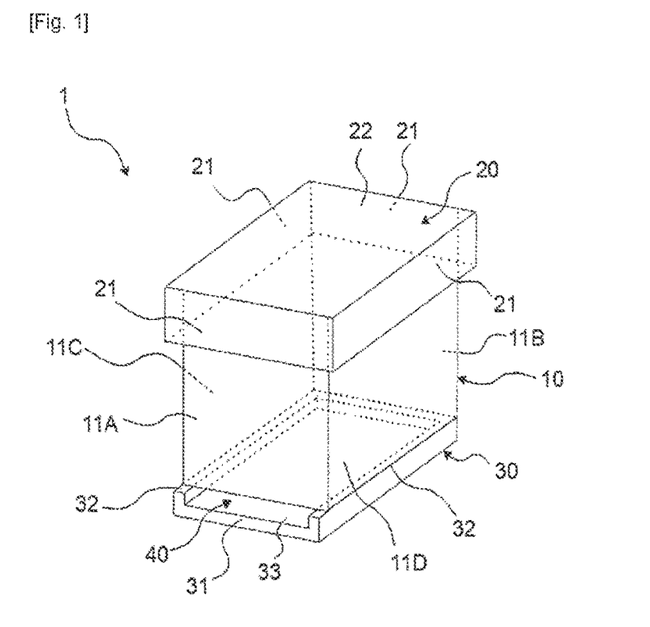
FIG. 1 is a perspective view of an embodiment of a hive.

As used herein, the terms "upper", "lower", "front", "rear", "right" and "left" are defined with respect to a front view of the hive as defined in FIG. 1, said front face comprising an opening for passage of the bees inwards or outwards from the hive. This definition, used here for explanatory purposes, cannot limit the scope of the present invention insofar as the passage opening of the bees could be located elsewhere, for example on a lateral face of the hive.

A non-limiting example of hive 1 according to the invention was shown in FIG. 1.

Hive 1

In this example, the hive 1 is of the Dadant hive type and comprises, in a simplified manner and for the purposes of clarity, a body 10 (commonly called the hive body), a removable roof cover 20, a floor 30, a passage opening 40 of the bees, a plurality of body frames 50 and at least one radiating partition 60, in a non-limiting manner.

Body 10

Figure 2:
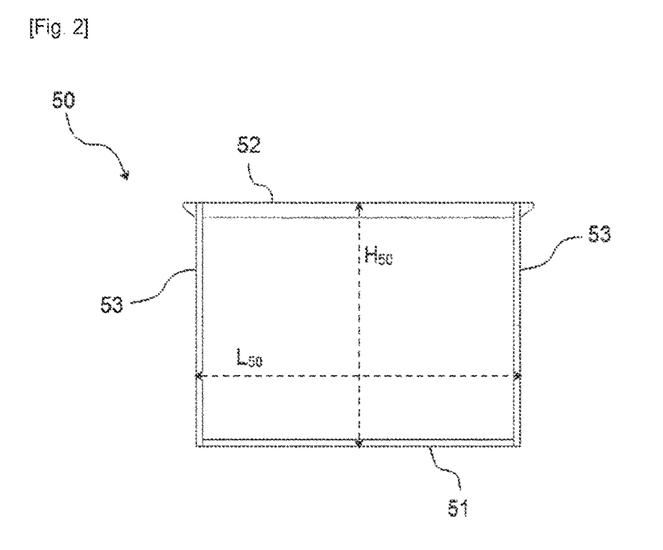
FIG. 2 shows an embodiment of a body frame for a hive.

The hive body 10 is of parallelepiped shape and comprises four vertically extending walls: a front wall 11A, a rear wall 11B (FIG. 3), opposite the front wall 11A, a left side wall 11C and a right side wall 11D. The side walls 11C and 11D each make it possible to connect the front wall 11A to the rear wall 11B. The front wall 11A comprises a lower edge. The body 10 is able to receive removable body frames 50, an example of which is shown in FIG. 2, on which the bees will build their combs, and one or more removable radiating partitions 60. The body frames 50 and the radiating partitions 60 are arranged vertically between the left side wall 11C and the right side wall 11D. In addition, the front wall 11A and the rear wall 11B each comprise an inner side, facing towards the inside of the hive 1.

Figure 3:
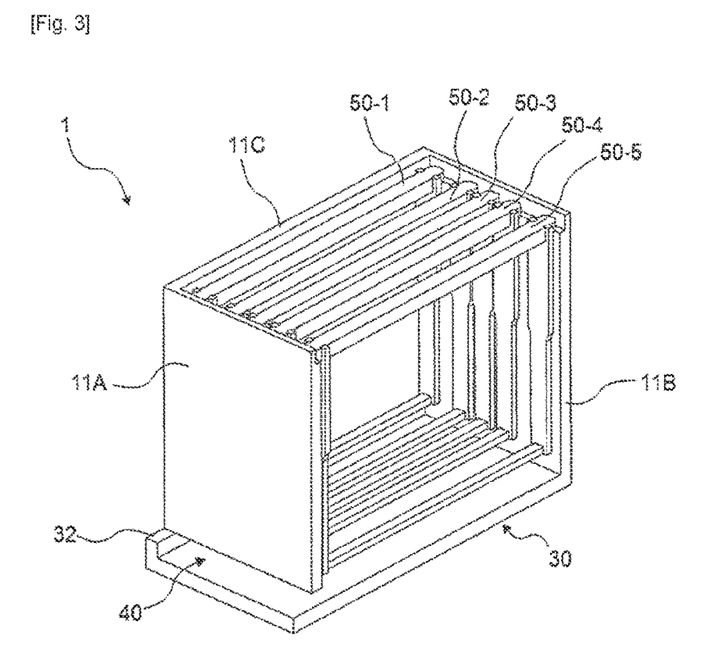
FIG. 3 shows a partial perspective view of the hive of FIG. 1 showing the floor, front, rear and left side walls of the hive body, wherein an assembly of body frames is mounted.

In reference to FIG. 3, the hive 1 comprises, on the inner face of the front wall 11A and the rear wall 11B, recesses for receiving the lateral edges of the body frames 50 and radiating partitions 50 in order to lock them in the hive body 10.

Roof Cover 20

Again in reference to FIG. 1, the roof cover 20 is also of parallelepiped shape and comprises four substantially vertical walls 21 and an upper plate 22 connecting said walls 21 so as to cap the walls 11A, 11B, 11C and 11D of the body 10 of the beehive, as shown in FIG. 1.

Floor 30

The floor 30 has the shape of a plate and comprises a rectangular bottom plate 31 to which are attached two lateral edges 32 extending on either side along the entire length of the bottom plate 31. The length of the floor 30 is greater than the length of the side walls 11C, 11D of the body 10 of the hive 1 so as to form a so-called "flight" surface 33 allowing for the taking off and landing of the bees.

The walls 11A, 11B, 11C and 11D of the body 10 rest on the side edges 32 of the floor 30 so as to form the passage opening 40 which extends between the bottom plate 31 and the side edges 32 of the floor 30 on the one hand and the lower edge of the front wall 11A of the body 10 on the other hand. The passage opening 40 allows the bees to pass inside or outside the hive 1.

Alternatively, at least one of the walls 11A, 11B, 11C, 11D of the body 10 could comprise the passage opening 40 and a flight surface 33 extending perpendicularly from said wall 11A, 11B, 11C, 11D under said passage opening 40. Furthermore, noted that, in another embodiment, hive 1 according to the invention could comprise more than one passage opening 40 of the bees.

Body Frame 50

In reference to FIG. 2, an embodiment of a body frame 50 is shown. Each body frame 50 is configured to be placed vertically in the hive 1 and comprises four thin edges, for example made of wood, including a lower edge 51, an upper edge 52, parallel to the lower edge 51, and two side edges 53, parallel to each other and connecting the lower edge 51 and the upper edge 52.

The thickness of each edge 51, 52, 53 designates the dimension of the edges along an axis normal to the plane wherein each body frame 50 extends. The length $L_{50}$ of a body frame 50 designates the distance separating the side edges 53. The height $H_{50}$ of a body frame 50 designates the distance separating the lower edge 51 and the upper edge 52.

The four edges 51, 52, 53 are connected by metal wires between which is inserted a wax foundation sheet (not visible), so that the bees build honeycombs there to then produce honey in the honeycombs. Furthermore, the queen bee may also lay bee eggs in certain alveoli in order to create new bees. Thus, the body frames 50 may also have a reproduction function in addition to a honey production function. Furthermore, the body frames 50 may also have a pollen storage function, in order to feed the bee larvae.

In reference to FIG. 3, a three-dimensional view of the floor 30, the front wall 11A, the rear wall 11B and the left side wall 11C of the body 10 of the hive 1 are shown as well as an assembly of five body frames 50-1, 50-2, 50-3, 50-4, 50-5 mounted in the hive 1. The body frames 50-1, 50-2, 50-3, 50-4, 50-5 are arranged vertically and parallel to each other and to the left side wall 11C and the right side wall 11D (not shown in FIG. 3) inside the hive 1.

The length of the upper edge 52 is greater than the length $L_{50}$, so that a portion of the upper edge 52 protrudes with respect to each side edge 53 to lock the body frame in the recesses of the inner faces of the front wall 11A and the rear wall 10B of the hive body 10.

Radiating Partition 60

Each radiating partition 60 is used to insulate the hive 1 from the cold by allowing a reduction in heat exchanges and better conservation of heat inside the hive 1.

FIGS. 4 to 8 show different embodiments of the radiating partition 60 according to the invention.

The radiating partition 60 has a substantially rectangular shape and is configured to be inserted between the front wall 11A and the rear wall 11B of a body 10 of beehive 1 in order to insulate the interior of said hive 1. When hive 1 comprises several radiating partitions 60, these radiating partitions 60 are preferably identical.

The radiating partition 60 comprises a rigid one-piece panel 61 made of at least one insulating material and of which at least one of the two faces is partially covered with at least one layer made of a so-called "radiating" material, i.e. capable of reflecting and radiating a substantial portion, at least 50%, of the thermal energy, in order to increase the efficiency of the thermal insulation by more effectively retaining the heat inside the hive 1.

The radiating partition 60 is delimited by an upper edge 62 extending horizontally, a lower edge 64, also extending horizontally parallel to the upper edge 62, two side edges 63 parallel to each other and connecting the upper edge 62 to the lower edge 64, and thus has two opposite faces 65.

Figure 4:
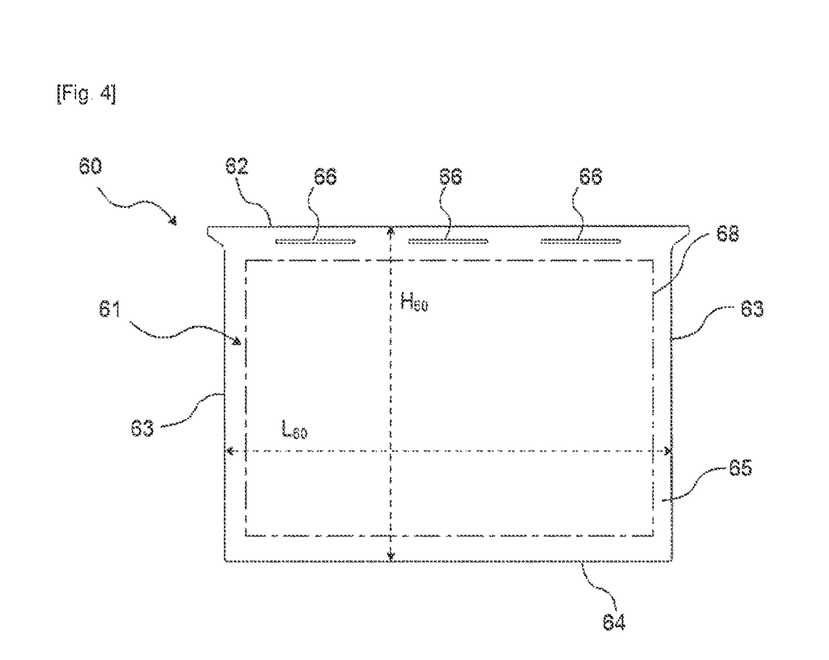
FIG. 4 shows a first embodiment of a radiating partition according to the invention, comprising a plurality of insertion members.
Figure 6:
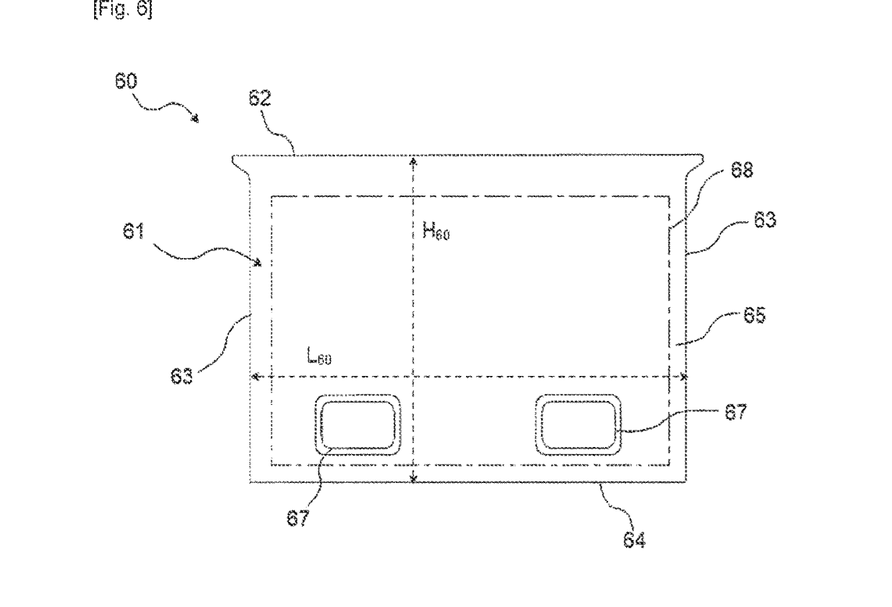
FIG. 6 shows a second embodiment of a radiating partition comprising a plurality of through-openings according to the invention.

The radiating partition 60 has substantially the same length and width dimensions as those of the body frames 50. Thus, as shown in FIGS. 4 and 6, the length $L_{60}$ of each radiating partition 60 separating the side edges 63 is identical to the length $L_{50}$ of the body frames 50. The height $H_{60}$ of each radiating partition 60 separating the upper edge 62 and the lower edge 64 is equal to the height $H_{50}$ of the body frames 50.

Preferably, the radiating partition 60 is shaped so that the bees may move on either side of said radiating partition 60 passing on the sides or under the radiating partition 60 but so that the queen, which is larger than the bees, cannot move under or on the sides of the radiating partition 60.

The thickness of each radiating partition 60 may be less than or equal to the thickness of the body frames 50. In particular, the thickness of each radiating partition 60 may be equal to half that of the body frames 50. In this case, for a hive 1 suitable for receiving a given number of body frames 50, it is only necessary to remove a single body frame 50 to replace it with two radiating partitions 60.

For each panel 61, the length of the upper edge 62 is greater than the length $L_{60}$ so that a portion of the upper edge 62 protrudes from each side edge 63 to hold each radiating partition 60 vertically in the same manner as the body frames 50. Thus, the radiating partitions 60 are mounted in the hive 1 in the same way as the body frames 50.

For example, panel 61 may be made of solid wood, such as balsa or any other solid wood with high insulation capacity. Alternatively, the panel 61 may be made of plywood, for example CTB-X, CTB-H or any other suitable type of plywood. In particular, the core of the panel 61 may be made of a material of polyurethane or polystyrene type, in particular of extruded polystyrene (e.g. of Styrodur® type), arranged between two layers of wood veneer, for example glued. Alternatively, the panel 61 may, for example, be an oriented strand board (OSB). Alternatively, for example, the panel 61 may be made of slatted wood.

In this example, the thermally radiating material layer is in the form of a sheet 68, attached to one face 65 or both faces 65 of the panel 61. Alternatively, the layer could be a coat of paint. Each sheet 68 is substantially equal in size to those of the faces 65 of the panel 61, preferably covering at least 80% of the surface of each face 65 of the panel 61. Preferably, a sheet 68 is attached on each face 65 of the panel 61. For example, each radiating sheet 68 may be made of aluminum or any other suitable material, preferably with a thermal emissivity of less than or equal to 0.20, or even 0.10. For example, unoxidized or polished aluminum with good radiation characteristics (thermal emissivity of about 0.09 for non-oxidized aluminum and of about 0.05 for polished aluminum), as well as polished (0.03) or oxidized zinc (0.10), polished copper (0.03) or polished brass (0.03 to 0.05), stainless steel (0.20), polished steel (0.20) or non-oxidized iron (0.20).

Insertion Member

Preferably, the radiating partition 60 comprises at least one insertion member suitable for receiving a tool for extracting the radiating partition. In particular, each insertion member is placed near the upper edge 62 of said radiating partition 60. In this way, when a radiating partition 60 is mounted in a hive 1, the beekeeper who wishes to remove the radiating partition 60 using an extraction tool may easily access the insertion member to insert the extraction tool and remove the radiating partition 60 from the hive.

Figure 5:
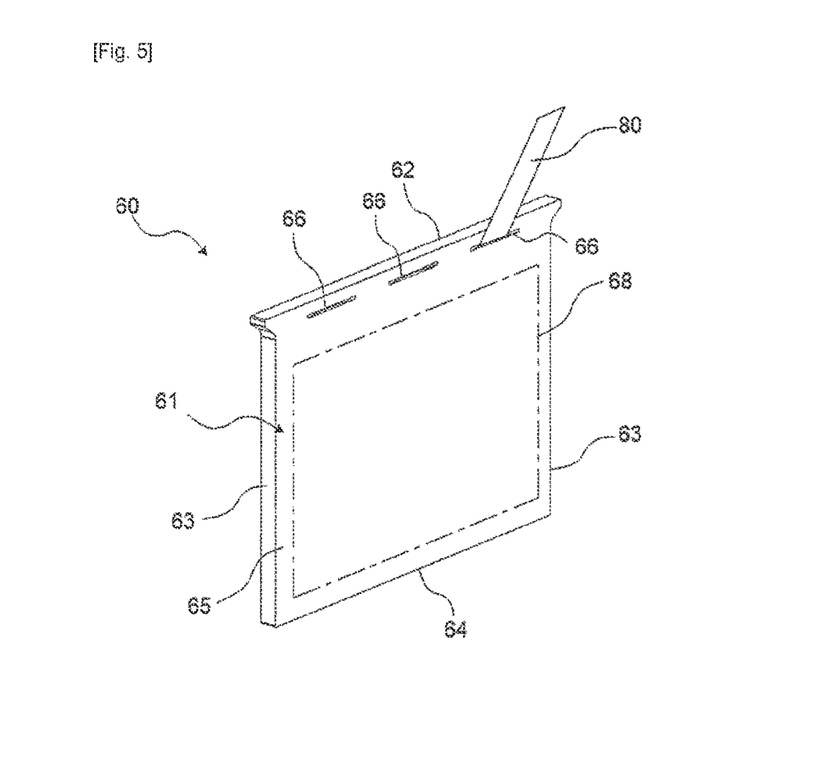
FIG. 5 shows a perspective view of the radiating partition of FIG. 4.

In the first embodiment shown in FIGS. 4 and 5, the insertion member is placed on at least one face 65 of the radiating partition 60. Preferably, the insertion member is a recess, in this example having the form of a groove 66 formed at the upper portion at least one of the faces 65 of the radiating partition 60, for example less than 2 centimeters from the upper edge 62. The groove 66 extends horizontally on the face 65 of the radiating partition 60 in the position of use. The groove 66 is formed so that an extraction tool, such as a frame lifter, may be easily inserted into said groove 66 in order to extract the radiating partition 60 from the hive 1, in particular by leverage on an adjacent frame. Preferably, several grooves 66 are formed in each face 65 of the radiating partition 60. Thus, in the example shown, each face 65 has a plurality of coaxial grooves 66.

According to another embodiment, not shown in the figures, the insertion member is placed on the upper edge 62. In this case, the insertion member may be in the form of a handle, hook, loop or the like, wherein the extraction tool may be inserted.

Thus, in reference to FIG. 5, a frame lifter 80 cooperates with the insertion member, i.e. the frame lifter 80 is partially inserted into the groove 66 by the beekeeper to extract the radiating partition 60 from the hive 1 by leverage, without however damaging the face 65 of the radiating partition 60 with the frame lifter 80.

Grid 70

Figure 7:
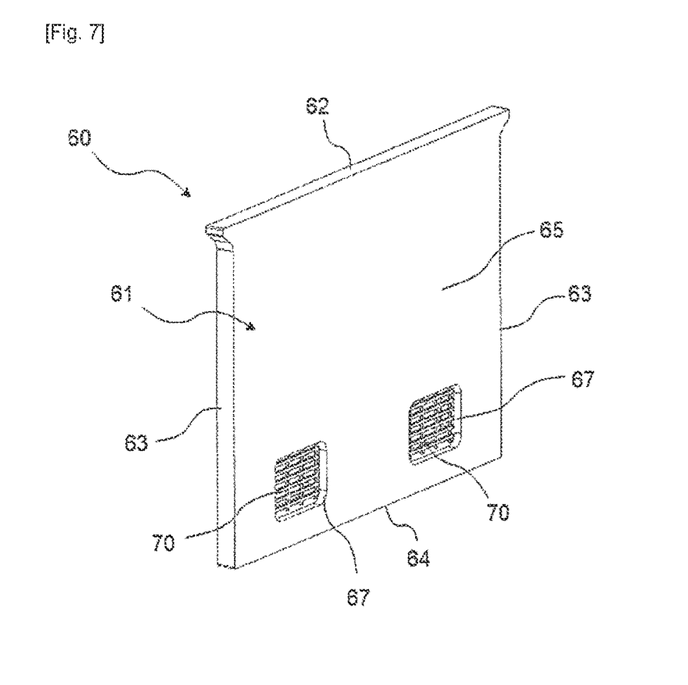
FIG. 7 shows the radiating partition of FIG. 6, a grid being further mounted in each through-opening.
Figure 8:
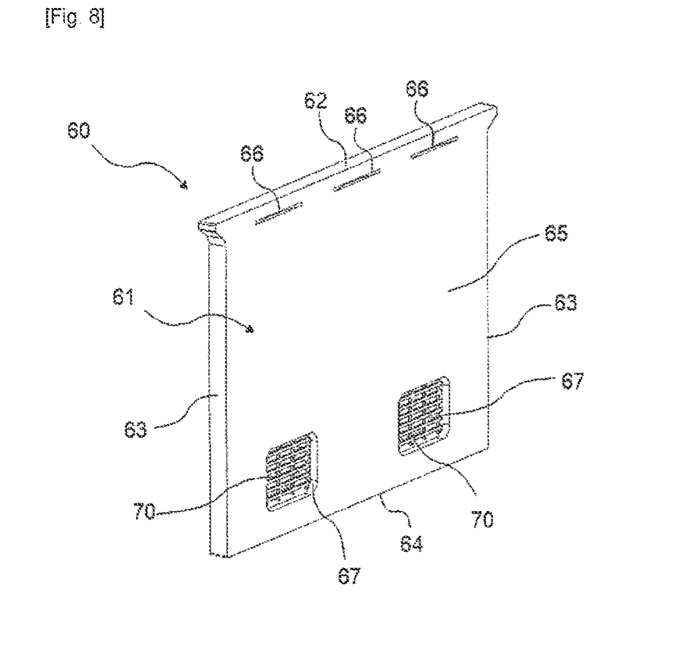
FIG. 8 shows a third embodiment of a radiating partition according to the invention, comprising a plurality of insertion members and a plurality of through-openings each comprising a grid.

In the embodiments shown in FIGS. 6 to 8, each radiating partition 60 comprises two through-openings 67 formed near the bottom edge 64. Alternatively, the radiating partition 60 could comprise a single through-opening 67 or more than two through-openings 67. The total surface on which the single through-opening 67 or the set of through-openings 67 extends is preferably less than 20% of the surface of the face 65 of the radiating partition 60. FIGS. 6 and 7 show a second embodiment of the radiating partition 60 according to the invention. FIG. 8 shows a third embodiment of the radiating partition 60 according to the invention.

In reference to FIGS. 7 and 8, the radiating partition 60 comprises a grid 70 mounted in each through-opening 67 of the panel 61. The grid 70 comprises a set of vertical and horizontal bars spaced so that the worker bees may pass through the grid 70 but the queen bee, the size of which is more substantial than the other bees, cannot pass through the grid 70. In this way, only the bees and not the queen may move easily from one side to the other of each radiating partition 60, in particular in order to produce honey over the entire surface of the wax foundation of the first frame 50-1 and the last frame 50-5 (FIGS. 3 and 9) and not only on the edges. In particular, only the bees and not the queen may access the first frame 50-1 and the last frame 50-5. In other words, the queen cannot lay bee eggs in the alveoli of the first frame 50-1 and the last frame 50-5. The first production frame 50-1 and the last production frame 50-5 therefore only have the function of producing honey, over their entire surface thanks to the grid(s) 70. The grids 70 are not visible in FIG. 6 for reasons of clarity, in order to clearly view the through-openings 67.

In reference to FIG. 8, a third embodiment of the radiating partition 60 is shown wherein the panel 61 comprises two through-openings 67, wherein a grid 70 is mounted in each one of them, and three grooves 66.

Figure 9:
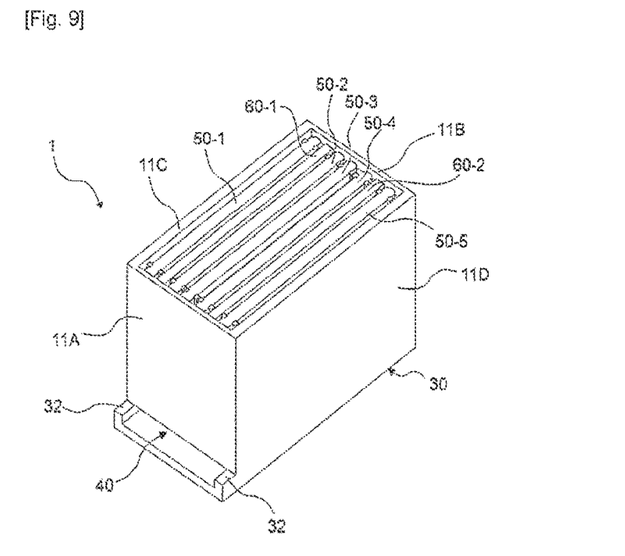
FIG. 9 shows a perspective view of the floor and a hive body, comprising an assembly of body frames and two radiating partitions according to the invention.

In the example shown in reference to FIG. 9, the hive 1 comprises a first radiating partition 60-1 and a second radiating partition 60-2. The first radiating partition 60-1 is placed in the hive 1 between a first body frame 50-1, adjacent to the left side wall 11C. The second radiating partition 60-2 is placed between a fourth body frame 50-4 and a fifth body frame 50-5, adjacent to the right side wall 11D.

Thus, the bees are insulated from the cold between the first radiating partition 60-1 and the second radiating partition 60-2, in particular because the radiating material allows the heat to be stored in the center of the body 10 of the hive 1, in particular the heat produced by the bees being reflected by the radiating partitions 60-1, 60-2.

Figure 10:
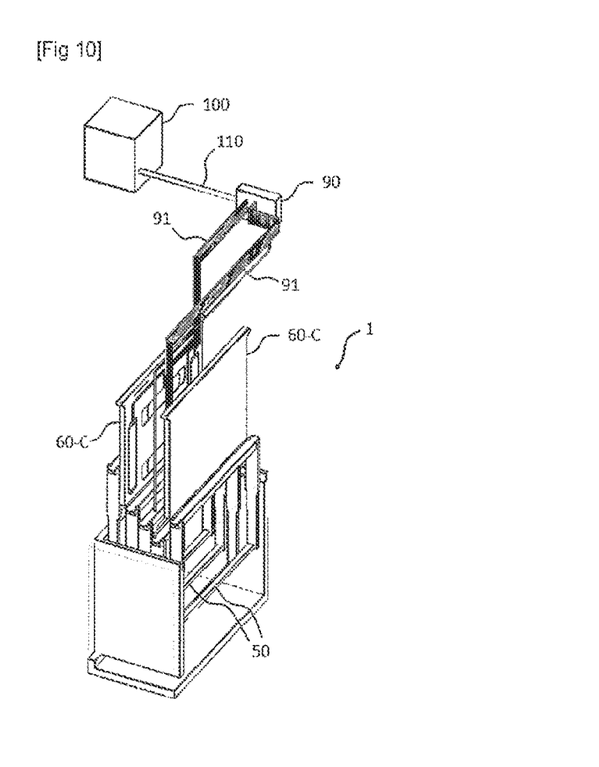
FIG. 10 shows in perspective and exploded view another embodiment of a hive according to the invention.
Figure 11:
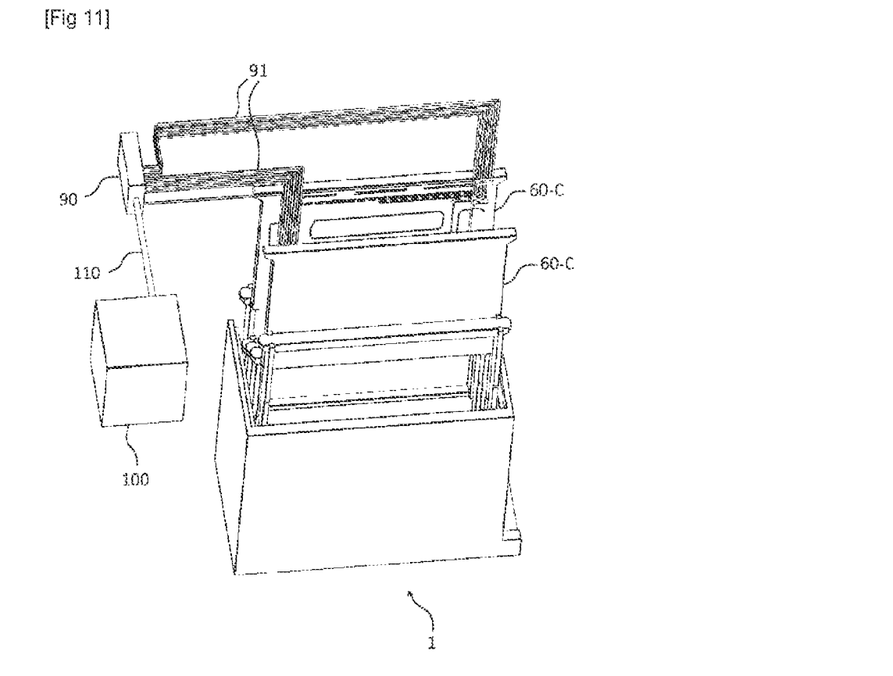
FIG. 11 shows another perspective view of the embodiment of FIG. 10.

FIGS. 10 and 11 show a specific embodiment of the hive 1 according to the invention.

In this embodiment, the hive 1 comprises a control module 85 and two heating radiating partitions 60-C.

The two heating radiating partitions 60-C are mounted in the same location as the first radiating partition 60-1 and the second radiating partition 60-2 of the preceding embodiment, i.e. at the second and penultimate position in the set of body frames 50.

Figure 12:
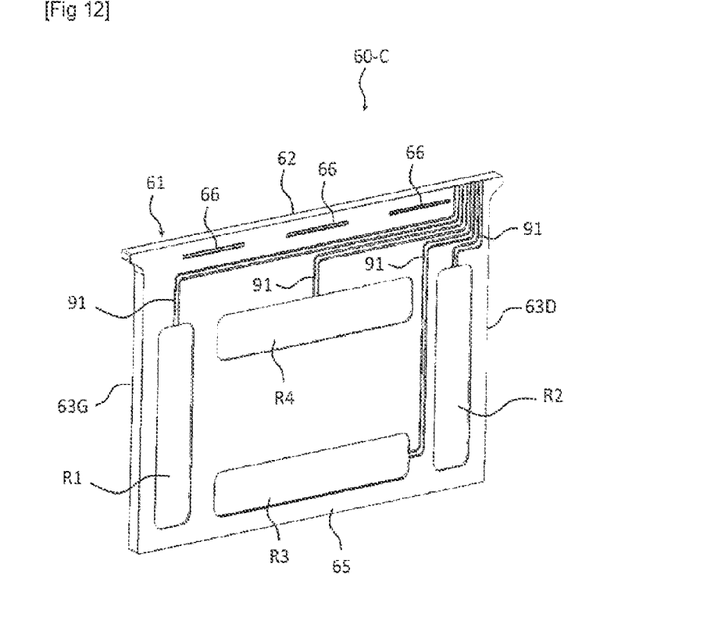
FIG. 12 shows a radiating partition known as the "heating radiating partition" of the hive in FIGS. 10 and 11.

Each heating radiating partition 60-C comprises several heating elements. In the example of FIGS. 10 to 12, the heating elements are in the form of heating resistances R1, R2, R3, R4.

In reference to FIG. 12, each heated radiating partition 60-C comprises in this non-limiting example four resistances R1, R2, R3, R4 extending longitudinally mounted on one of the faces of said heating radiating partition 60-C. Two resistances R1 and R2 are each arranged extending along the left side edge 63G and the right side edge 63D of the panel 61 respectively. A resistance R3 is arranged extending along the lower edge 64 of the panel 61 and an R4 is arranged in the upper portion of the panel extending transversely parallel to the upper edge 62 of the panel, under the three grooves 66.

The resistances R1, R2, R3, R4 are mounted on the faces which are turned towards the center of the hive 1 in order to heat the body frames 50 which are placed between the two heating radiating partitions 60-C.

The control module 90 may be internal or external to the hive 1. In particular, the control module 90 may be mounted in or on the hive 1 or placed outside the hive 1.

The control module 90 is electrically powered by an internal or external power source 100.

The control module 90 receives temperature measurements from temperature probes (not shown for clarity) placed inside the hive 1 and to electronically regulate the temperature inside the hive 1 between a floor temperature and a ceiling temperature (thermostat function) from the temperature measurements received from the probes.

The control module 90 regulates the temperature inside the hive 1, for example via micro-interruptions and/or by controlling the operation of only a portion of the heating resistances R1, R2, R3, R4 of the partition(s) 60-C of the hive 1.

The floor temperature may be selected so that the bees do not suffer from the cold, especially in winter. Preferably, the floor temperature is greater than or equal to 20° C., preferably 30° C., preferably still 40° C.

Advantageously, the floor temperature may be chosen to kill the "*Varroa destructor*", which is a species of parasitic mites of the adult bee, larvae and nymphs. For this purpose, the floor temperature should preferably be greater than or equal to 42° C.

The ceiling temperature is chosen so as to avoid overheating the hive 1 which could kill the bee larvae, for example above an ambient temperature of 44° C. For this purpose, the ceiling temperature may be chosen so that the internal ambient temperature of hive 1 does not reach the overheating temperature, i.e. the ceiling temperature must be lower than the overheating temperature and chosen so that the heating inertia of the resistances R1, R2, R3, R4 (i.e. the heat they continue to produce when their electrical power is switched off) does not allow the overheating temperature to be reached. For example, the ceiling temperature may be 43° to ensure that the internal temperature does not reach 44° C. by inertia.

For example, the treatment of *varroa* may be carried out for 2 to 3 hours to ensure it is destroyed.

Preferably, the floor temperature and ceiling temperature may be set by a user. For example, this setting may be made directly in the control module 90 or remotely, for example via an app and a wireless communication link, e.g. Wifi, Bluetooth®, 2G/3G/4G/5G, in order to transmit the setting data to the control module 90 for adjustment.

The current is supplied by an electrical power source 100 capable of generating electrical current and providing voltage to the control module 90. This electrical power source 100 may be a battery embedded in hive 1, for example inside hive 1 or mounted on one of the walls of hive 1, or be external to hive 1, for example in the form of a diesel generator or external electrical generator. In the latter case, the external electrical power source 100 may be connected to the thermostat 90 via a cable 110 and connected to a connector (not shown) mounted on one of the walls of the hive 1 and electrically connected to the control module 90.

The two heating radiating partitions 60-C are electrically connected to the control module 90 in order to receive the current generated by the electrical power source 100 when the measured temperature is below a predetermined floor temperature and thus power the resistances R1, R2, R3, R4 with current to heat the interior of the hive 1. Each resistance R1, R2, R3, R4 is connected to the control module 90 by a pair of internal cables 91.

In this embodiment, the two heating radiating partitions 60-C generate heat inside the hive 1 by being electrically powering the resistances integrated on the faces of heating radiating partitions 60-C in order to heat the interior of the hive 1.

The radiating partition 60 according to the invention therefore makes it simple, inexpensive, reliable and effective to insulate the hive 1 to protect the bees from the cold, particularly when it comprises one or more heating elements. Note that any variant different from the embodiment described above but having the same function of radiating partition with easy and fast extraction is considered by this document. In particular, the shape, dimensions and elements of the hive 1, hive 1 body 10, lid 20, floor 30, body frames 50 and radiating partitions 60 in no way limit the scope of the present invention.

The invention claimed is:

1. A radiating partition for a beehive, said beehive comprising a floor, a front wall, two side walls, a rear wall and a removable roof cover, said radiating partition comprising a one-piece rigid panel made of at least one insulating material of which at least one of the two sides is partially covered with at least one layer of a radiating material, the radiating partition being configured to be inserted between the front wall and the rear wall of the beehive in order to insulate the interior of the beehive; and wherein the radiating partition delimits at least one through-opening wherein a grid is mounted adapted to prevent the queen of the beehive from crossing the opening while allowing the worker bees to pass through.

2. The radiating partition according to claim 1, wherein the layer of radiating material has a thermal emissivity of less than 0.2.

3. The radiating partition according to claim 2, wherein the layer of radiating material has a thermal emissivity of less than 0.1.

4. The radiating partition according to claim 1, wherein the panel is made of solid wood, plywood, oriented strand board or slatted wood.

5. The radiating partition according to claim 1, comprising at least one insertion member suitable for receiving a tool for extracting the radiating partition to extract said radiating partition from the beehive.

6. The radiating partition according to claim 5, the panel being delimited by an upper edge, a lower edge, two side edges and two faces, each of the faces connecting the upper edge, the lower edge and the side edges, the insertion member is in the form of a groove formed at the upper portion of at least one of the two faces of the radiating partition.

7. The radiating partition according to claim 1, wherein the radiating partition is full.

8. The radiating partition according to claim 1, comprising a lower edge and wherein the through-opening is arranged close to the lower edge.

9. The radiating partition according to claim 1, known as the "heating radiating partition", comprising at least one integrated heating element.

10. The heating radiating partition according to claim 9, wherein the at least one integrated heating element is of the resistance type.

11. The heating radiating partition according to claim 10, comprising four resistances extending longitudinally mounted on one of the faces of the heating radiating partition, two of which are each arranged by extending along a side edge of the panel, one is arranged by extending along the lower edge of the panel and one is arranged in the upper portion of the panel by extending transversely.

12. A beehive comprising a floor, a front wall, two side walls, a rear wall, a removable roof cover, at least one body frame, each body frame being in the form of a removable frame of the beehive, said frame comprising four edges connected by metal wires between which a wax foundation sheet is inserted allowing honey to be produced by the bees, said beehive being characterized in that it further comprises at least one radiating partition comprising a one-piece rigid panel made of at least one insulating material of which at least one of the two sides is partially covered with at least one layer of a radiating material, and wherein the radiating partition being configured to be inserted between the front wall and the rear wall of the beehive in order to insulate the interior of the beehive; and wherein the radiating partition delimits at least one through-opening wherein a grid is mounted adapted to prevent the queen of the beehive from crossing the opening while allowing the worker bees to pass through.

13. The beehive according to claim 12, comprising at least one heating radiating partition comprising at least one integrated heating element.

14. The beehive according to claim 13, further comprising at least one temperature measurement probe placed inside the beehive and a control module mounted inside or outside the beehive by being electrically connected to at least one heating element of the heating radiating partition and configured to, when said control module is electrically powered, receive temperature measurements from at least one probe and regulate the temperature inside the beehive between a floor temperature and a ceiling temperature.

* * * * *